Feb. 17, 1931. M. LOUGHEAD 1,792,750
BRAKE MECHANISM
Filed Nov. 6, 1928 2 Sheets-Sheet 2

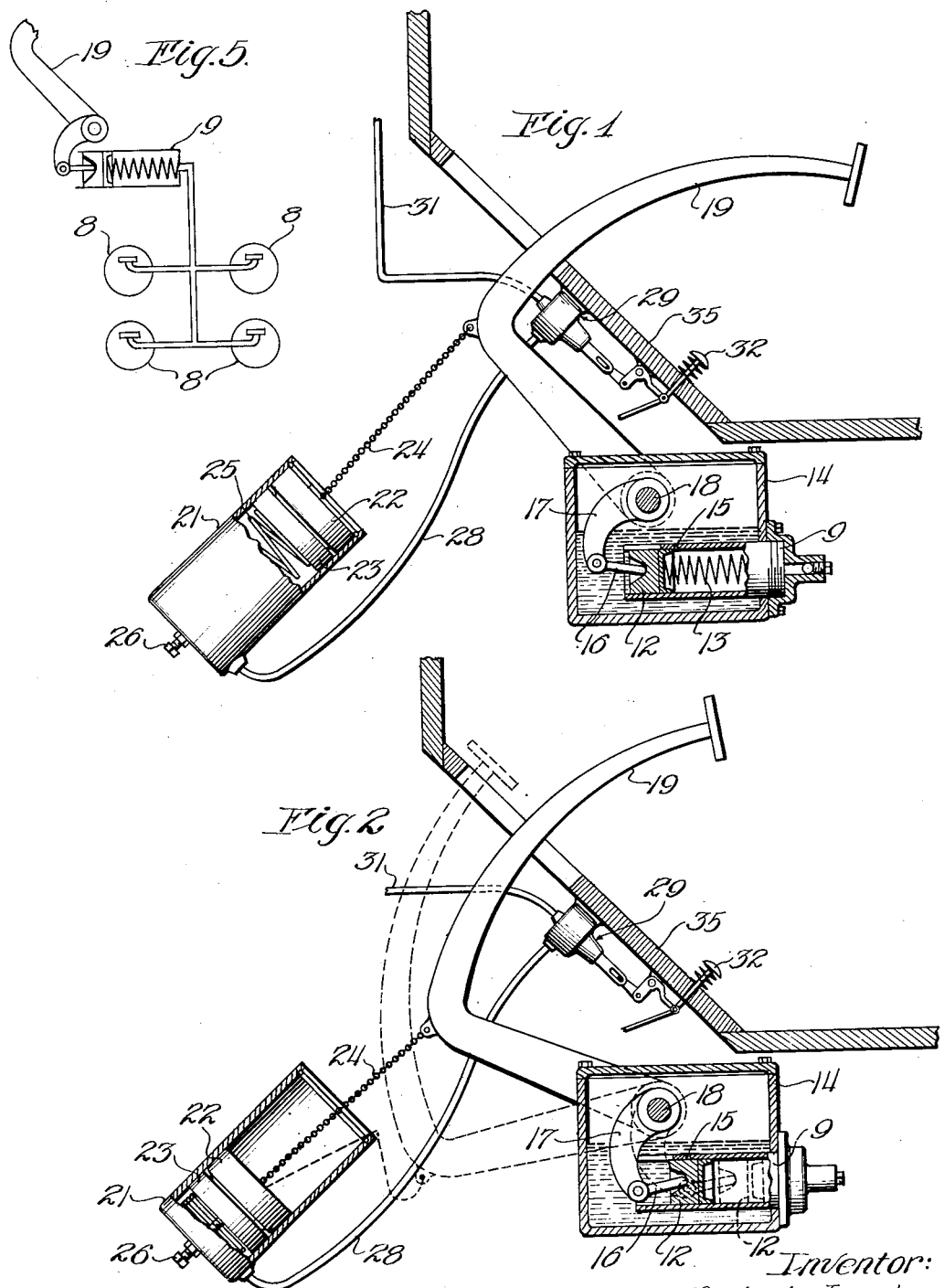

Inventor:
Malcolm Loughead
By Williams, Bradbury, McCaleb & Hinkle
Attys.

Patented Feb. 17, 1931

1,792,750

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

BRAKE MECHANISM

Application filed November 6, 1928. Serial No. 317,590.

This invention relates to a brake mechanism and more particularly to a slack removing device for a brake mechanism.

In the operation of a brake mechanism a considerable movement of the brake pedal is necessary in order to take up the play between the mechanically interconnected parts and also to take up the clearance between the brake shoes and the brake drums before any braking effect takes place.

An object of the present invention is to provide a device for automatically removing the slack from the brake system and moving the brake shoes into contact with the wheel drums when the accelerator is returned to its normal position.

A further object is to provide a slack remover for a brake system which becomes effective when minimum power is supplied to the vehicle.

A further object is to provide a slack remover for a brake system which is operated by power supplied by the motor of the vehicle to depress the brake pedal a definite amount to remove the slack from the system.

In accordance with the general features of the invention, a vacuum cylinder operable by the vacuum of the manifold of a motor is provided having a piston connected to the brake pedal and controlled by a valve actuated in response to the position of the accelerator to partially depress the brake pedal when the accelerator is in its normal released position.

Other objects and advantages of the invention will appear as the description proceeds.

In the drawings,

Fig. 1 is a side elevation, partly in section, of a brake mechanism embodying the invention;

Fig. 2 is a similar view showing the brake pedal partially depressed to remove the slack from the system;

Fig. 5 is a schematic view of the brake mechanism.

Figure 3:
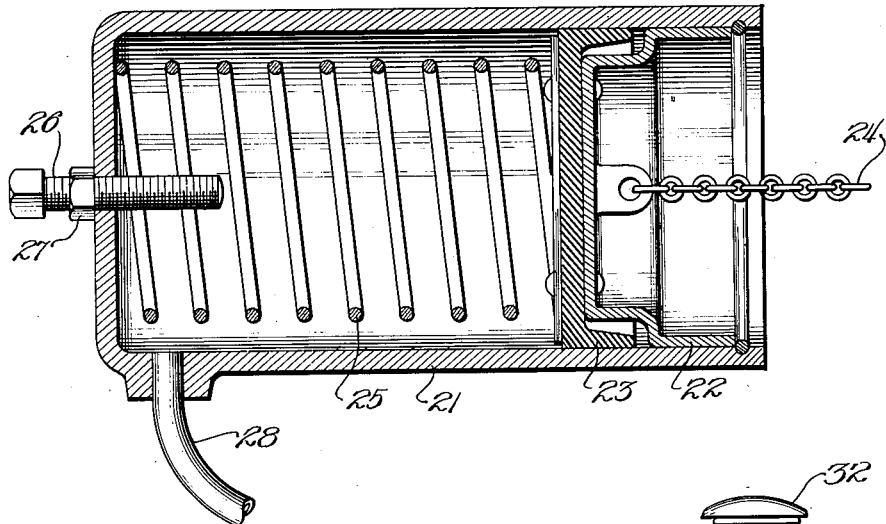
Fig. 3 is a cross section of the slack removing cylinder.
Figure 4:
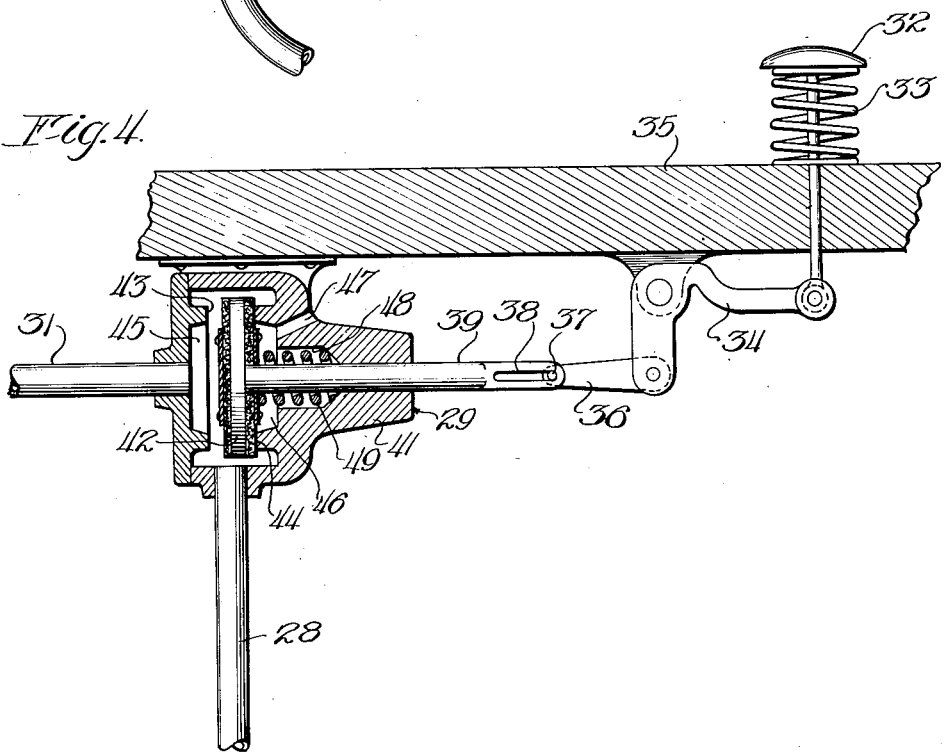
Fig. 4 is a view illustrating the control valve connected to the accelerator showing the control valve in the section.

The invention will be described in connection with a hydraulic brake mechanism, although it will be apparent that it is readily applicable to any type of brake mechanism.

In the brake mechanism the wheel brakes 8 are actuated in response to a pressure produced in the master cylinder 9. The master cylinder has a piston 12 reciprocable therein which is normally held in its retracted position by a spring 13. The master cylinder is enclosed in a fluid reservoir 14 in which a supply of fluid is maintained and the reservoir communicates with the master cylinder through a port 15 which is located at a point immediately in front of the piston when the latter is in its retracted position, and serves to replenish the supply of fluid in the cylinder in case any of the fluid is lost from the system through leakage.

The piston 12 is provided as its rearward end with a deep pocket which is engaged by a rod 16 pivotally connected to an arm 17. The arm 17 is mounted upon a shaft 18 which may be rotated by a pedal 19 to move the piston of the master cylinder forwardly and produce a brake applying pressure in the system. In brake systems of the prior art it is necessary to depress the brake pedal a considerable amount before the brake shoes come in contact with the brake drums.

In the apparatus illustrating my invention I provide a cylinder 21 for partly depressing the brake pedal 19 when the accelerator is in its released position.

The cylinder 21 has a piston 22 slidably mounted therein having a packing cup 23 to prevent air from entering the cylinder past the piston. The piston is connected to the brake pedal by means of a flexible inextensible connector 24, which is preferably a chain.

A spring 25 serves to maintain the piston in its normal position, in which position of the piston the brake pedal 19 is completely released.

The bottom of the cylinder 21 is provided with a threaded aperture into which a set screw 26 is threaded to adjust the length of movement of piston 22. Set screw 26 is provided with a lock nut 25 to securely retain it in the adjusted position.

Cylinder 21 is connected through a tube 28, valve mechanism 29 and tube 31 to the manifold of the motor vehicle, in which a constant vacuum is maintained by the operation of the motor.

The accelerator is attached to a bell crank lever 34, which is pivotally mounted on the floor board 35. One arm of the bell crank lever has a link 36 pivotally attached thereto which carries a pin 37 at its end which is adapted to engage a slot 38 in the valve stem 39. The valve stem 39 extends into a valve housing 41 and carries a valve head 42 at its end.

The valve housing is provided with a valve seat 43 and a valve seat 44. The valve seat 43 cooperates with the valve housing to form a chamber 45 communicating with the tube 31, which leads to the manifold of the motor. The valve seat 44 cooperates with the housing to form a chamber 46 which communicates with the atmosphere through a duct 47 in the wall of the housing. The housing 41 is provided with a recess 48 which is adapted to receive a spring 49 for urging the valve head 42 against the valve seat 43.

A depression of the accelerator 32 serves to rotate the bell crank lever 34 about its pivot, causing link 36 to move toward the valve mechanism and allowing spring 49 to seat valve head 42 against the valve seat 43, thereby connecting cylinder 21 through tube 28, chamber 46 and duct 47 to the atmosphere. In this position of the valve, spring 25 in the cylinder 21 will move piston 22 outwardly, allowing the brake pedal to assume its normal idle position. A further depression of accelerator 32 will cause the pin 37 to slide in slot 38 without affecting the position of the valve mechanism.

When the accelerator is released, spring 33 will return to its normal released position, causing bell crank lever 34 to seat valve head 42 against valve seat 44 against the compression of spring 49. In this position of the valve mechanism, cylinder 21 will be connected through tube 28, chamber 45 and tube 31 to the manifold of the motor vehicle, and the vacuum which constantly exists in the manifold will evacuate cylinder 21, causing the atmospheric pressure to depress piston 22 against the set screw 26. This movement of the piston depresses pedal 19, causing it to actuate the piston of the master cylinder sufficiently to take up the slack of the mechanically interconnected parts and to move the brake shoes into contact with the brake drums. The set screw 26 is preferably so adjusted that the brake shoes will be moved into contact with the brake drums without exerting sufficient pressure to cause any braking effect. The operator may then apply as much pressure as desired to the brake pedal to apply the brakes.

It has been found that in an ordinary brake mechanism where the brake pedal has a movement of 12 inches, about 5 inches of this movement may be taken up by the slack remover, allowing 7 inches of movement for the operator to vary the pressure upon the brakes. If for any reason the vacuum should fail or be ineffective to operate the slack removing device, it is only necessary for the operator to produce an additional movement manually.

While I have illustrated and described a preferred embodiment of the invention, it is to be understood that my invention is not to be limited to the details illustrated and described herein but that the scope of my invention is defined solely by the following claims.

I claim:

1. In a brake mechanism for a motor vehicle having an accelerator, means for applying the brakes, a fluid pressure cylinder having a piston movable therein and connected to the means for applying the brakes, a set screw in the cylinder for adjusting the length of the piston stroke, and means operative in response to the accelerator to control the fluid pressure in the cylinder thereby removing the slack from the brake applying means in one position of the accelerator.

2. In a brake mechanism for a motor vehicle, the combination of a brake system including a rotatable member, a friction member normally spaced from said rotatable member, and brake applying means for placing said members in braking engagement, said means having a slack take-up portion of its operation devoted solely to moving said members into contact with each other without the production of any braking effort, and separate means for partially operating said brake applying means, said separate means coordinated with said brake system whereby said separate means operates said brake applying means only through the slack take-up portion of its operation.

3. In brake mechanism for a motor vehicle, a brake system including a rotatable member, a friction member, retractile means normally maintaining said members in spaced relation, and brake applying means for moving said friction member into braking engagement with said rotatable member, said applying means having a first movement devoted solely to overcoming said retractile means, said first movement incapable of producing any braking effect, and power means coordinated with said system and operating said brake applying means through its first movement only.

4. In a brake mechanism for a motor vehicle, the combination of a rotatable member, a friction member adapted to cooperate with said rotatable member to create a braking action, brake applying means for moving said friction member into braking engagement with said rotatable member, a cylinder, valve means connecting said cylinder with a source of power, a piston in said cylinder, means connecting said piston with said brake applying means, and means for limiting the stroke of said piston, said means being independent of the force exerted on said piston by said source of power.

5. In a brake mechanism for a motor vehicle, the combination of friction members, manual means for operating said friction members, power means for operating said manual means through a part of its range of operation, and means for controlling the extent of operation of said manual means by said power means, said control means being separate from and independent of the force exerted by said power means on said manual means.

6. In a brake mechanism for a motor vehicle having an internal combustion engine provided with the usual inlet manifold, the combination of friction members for applying a braking force to the vehicle, manual means for operating said friction members, a cylinder, a piston in said cylinder, means connecting said piston with said manual means, valve means connecting said cylinder with the intake manifold, said valve means interconnected with throttle mechanism for controlling the power developed by said internal combustion engine, said cylinder being of sufficient size to produce a full stroke of said piston whenever said valve means places said cylinder in communication with said manifold, and means for limiting the stroke of said piston to an amount less than the full length of said cylinder, said last-named means being independent of said valve means.

In witness whereof, I hereunto subscribe my name this 1st day of November, 1928.

MALCOLM LOUGHEAD.